United States Patent Office 3,366,035
Patented Jan. 30, 1968

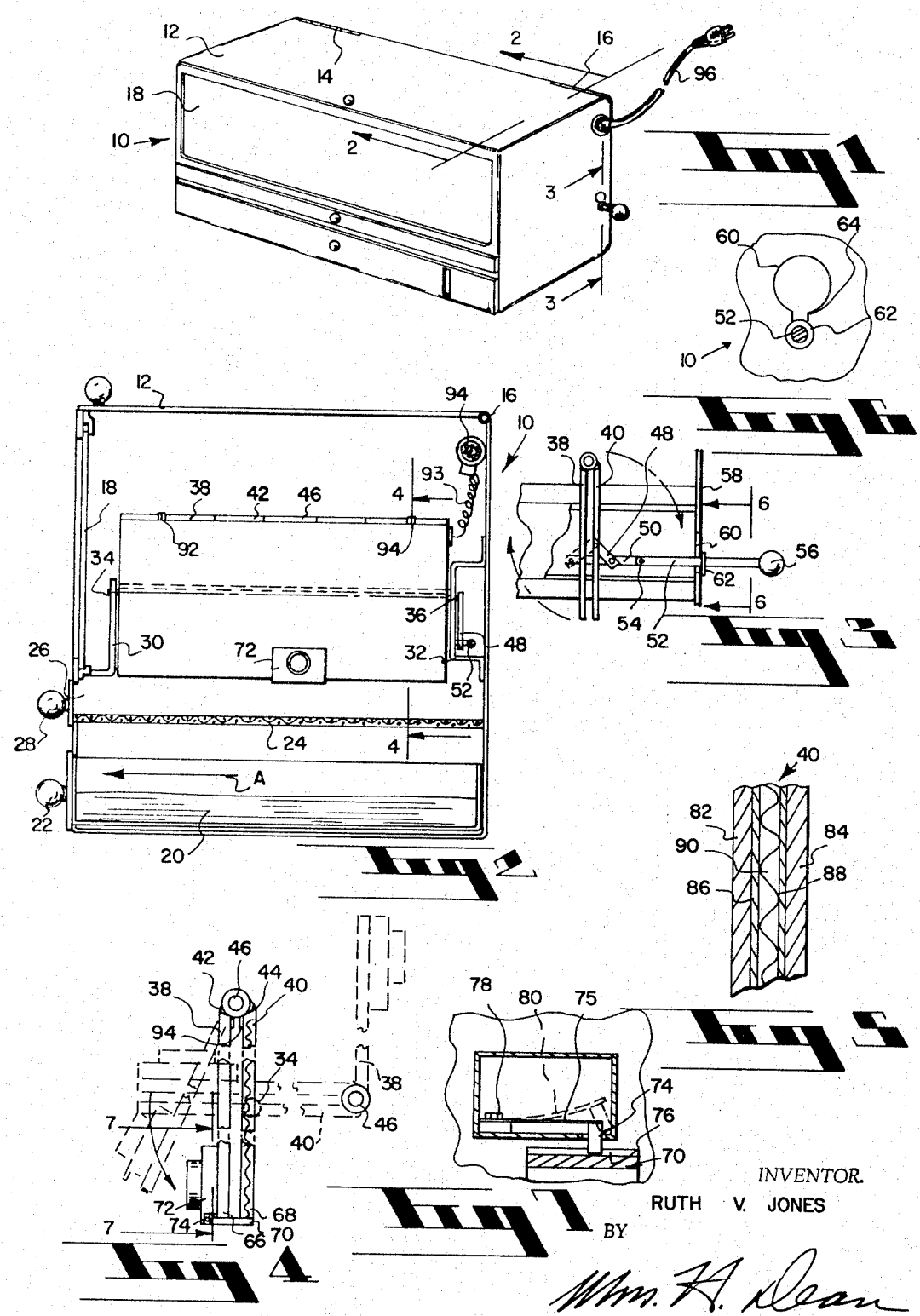

3,366,035
BACON TOASTER
Ruth V. Jones, 45 W. Moreland,
Phoenix, Ariz. 85003
Filed Sept. 27, 1965, Ser. No. 490,396
5 Claims. (Cl. 99—334)

This invention relates to a bacon toaster, and more particularly to a bacon toaster wherein strips of bacon may be clamped between a pair of vertically disposed plates, during toasting of the bacon, whereby the drippings from the bacon may gravitate into a sump below the plate and whereby the plates may be pivoted into a substantially horizontal position for loading bacon into position between said plates.

In accordance with conventional practice, most bacon is deep fried in a pan or fried on the upper surface of a griddle plate. When bacon is fried under either of the foregoing conditions, it tends to distort into a substantially corrugated shape and, consequently, only portions of the bacon may contact the cooking surface of the pan or the plate, otherwise, the bacon must be deep fried or turned several times in order to be uniformly cooked.

Accordingly, it is an object of the present invention to provide a bacon toaster having a pair of relatively pivoted plates between which bacon may be clamped and cooked uniformly and whereby the plates may be disposed in an inclined or a vertical position promoting drainage of the grease rendered from the bacon, during the frying thereof.

Another object of the invention is to provide a bacon toaster having a pair of relatively pivoted plates between which bacon may be clamped, during the cooking thereof, and whereby the plates are held clamped against the bacon by a thermostatically responsive device which automatically releases the bacon, when the moisture content thereof is sufficiently reduced to allow the temperature of the plates to reach a predetermined elevated degree.

Another object of the invention is to provide a novel bacon toaster having a pair of relatively pivoted plates between which slices of bacon may be clamped and held in a vertical or inclined position for drainage during cooking thereof; said plates being pivotal into a horizontal position and pivotally movable apart for facility in reloading the toaster between the plates with fresh bacon, whereupon the plates may again be pivoted to an inclined or vertical position for further cooking procedure.

Another object of the invention is to provide a novel bacon toaster having a pair of pivotally mounted clamping plates between which bacon may be clamped in a flat position and cooked; said plates being disposed above a screen which, in turn, is superimposed above a grease catching sump, so that the bacon grease may pass through the screen and into the sump and whereby the screen may catch the bacon when it is released from a position between the plates, so that the bacon may be withdrawn from the toaster, on the screen, by slidable action of the screen outwardly from the bacon toaster frame of the invention.

Another object of the invention is to provide a bacon toaster wherein bacon may be toasted and in which the oily vapors from the toasting bacon may be contained and, thus, preventing the escape of the oily vapors from the bacon and the collection of such oily vapors on the surrounding walls and other articles within the area in which the bacon is being toasted.

Further objects and advantages of the present invention may be obvious from the following specification, appended claims, and accompanying drawings, in which:

FIG. 1 is a perspective view of a bacon toaster, in accordance with the present invention;

FIG. 2 is an enlarged transverse sectional view thereof taken from the line 2—2 of FIG. 1;

FIG. 3 is an enlarged fragmentary sectional view taken from the line 3—3 of FIG. 1;

FIG. 4 is an enlarged fragmentary sectional view of the bacon toasting plates of the invention taken from the line 4—4 of FIG. 2;

FIG. 5 is a fragmentary sectional view of one of the bacon engaging and toasting plates of the invention, showing a heating element therein;

FIG. 6 is an enlarged fragmentary sectional view taken from the line 6—6 of FIG. 3; and FIG. 7 is an enlarged fragmentary sectional view of a thermostatic latch mechanism taken from the line 7—7 of FIG. 4.

As shown in FIG. 1 the bacon toaster of the present invention is provided with a substantially box-shaped frame 10 adapted to completely enclose bacon being toasted. The frame comprises a top cover 12 pivotally mounted on the frame by hinges 14 and 16 which are axially horizontal. The box-shaped frame of the invention is also provided with a window 18, in the front thereof, and as shown in FIG. 2 of the drawings, an internal lower portion of the frame carries a slidably mounted drip pan 20 having a drawer pull knob 22 manually engageable for moving the drip pan 20 outwardly in a direction of an arrow A, in FIG. 2 of the drawings, for removing the drip pan and for emptying the grease from the sump tray 20.

Directly above the sump tray 20 is a slidably mounted drawer screen 24 mounted in the bottom of a drawer 26 having a manually operable knob 28 for withdrawing the screen 24 outwardly in the direction of the arrow A and for carrying bacon thereon, to a position outwardly of the frame 10, as will be hereinafter described in detail.

Disposed above the screen 24 are brackets 30 and 32 fixed to opposite inner sides of the box-shaped frame 10. These brackets pivotally support stub shafts 34 and 36 on a substantially horizontal axis and these stub shafts 34 and 36 pivotally mount a pair of bacon holding and cooking plates, as shown in FIG. 4 of the drawings. This pair of bacon holding and cooking plates includes one plate 38 and a second plate 40, these plates having first edges 42 and 44 pivoted together by a hinge structure 46. The plate 40 is fixed at its opposite ends to the trunnions 34 and 36 and secured to the trunnion 36 is a lever 48, as shown in FIGS. 2 and 3 of the drawings. This lever 48 is connected to a link 50, which is pivotally connected to a manual control rod 52 by means of a pivot pin 54. The manual control rod is provided with an extending handle 56, extending outwardly beyond an end 58 of the frame 10. As shown in FIG. 6, the rod 52 extends through a bayonet lock opening 60, shown in FIGS. 3 and 6 of the drawings. The rod 52 is provided with a washer shoulder 62 thereon which is larger in diameter than a lower slot portion 64 of the opening 60 which, at its upper end, is large enough to receive the washer 62 and to permit the passage thereof through the end 58 of the frame 10, thus, to permit pivotal movement of the lever 48 into the broken line position, as shown in FIG. 3, and to pivot the pair of plates 38 and 40 from the solid line position shown in FIGS. 3 and 4, to the substantially horizontal broken line position shown in FIG. 4 of the drawings, for the purpose of loading bacon into a position between the plates, as will be hereinafter described.

The plates 38 and 40, as shown in FIG. 4 of the drawings, are provided with edges 66 and 68, respectively, which are opposite to the pivotally connected edges 42 and 44, hereinbefore described. Connected to the edge 68 is a latch plate 70 and carried by the plate 38 near its edge 66 is a thermostatic latch means 72 having a thermostatically operable plunger 74 therein.

Attention is directed to FIG. 7 of the drawings, in which the plate 70 is provided with a notch for a ledge 76 in which the latch member 74 is engaged. This member 74 is supported by a bimetallic thermostatic element 75 mounted at 78 and adapted to flex into a broken line position 80 when temperature of the plate 38 reaches a predetermined degree.

The plate 40 is a multilayer plate having outside heat conducting layer portions 82 and 84 with dielectric sheets 86 and 88 at the sides of these plates which face each other. A heating element 90 is disposed between the dielectric plates 86 and 88 and this heating element is an electrical resistance heating element adapted to heat the plate 40. This heating element 90 is coupled to a flexible conductor 93 extending to a conduit 94 electrically connected to a conventional plug cord 96 adapted to be plugged into a conventional 110 volt AC electrical supply.

As shown in FIGS. 2 and 4 of the drawings, coil springs 92 and 94 are interposed in the end structure 46. These springs have opposite ends disposed between the plates 38 and 40, as shown in FIG. 4 of the drawings, tending to force the plates apart and, thus, to force the plate 38 away from the plate 40, when the thermostatic latch member 74 is withdrawn from the notch 76. Thus, bacon will be automatically dropped from the position between the plates 38 and 40, as will be hereinafter described in detail.

The operation of the bacon toaster of the present invention is substantially as follows:

When it is desired to place bacon between the plates 38 and 40 for the toasting thereof, the cover 12 of the frame 10 is opened by pivoting the cover 12 about the axes of the hinges 14 and 16. The plates 38 and 40 are then rotated to the substantially horizontal broken line position shown in FIG. 4, by actuating the manual control handle 56, shown in FIG. 3 of the drawings, and as hereinbefore described.

When the plate 38 is pivoted to the broken line position, as shown in FIG. 4 of the drawings, about the axes of the hinge 46, the plate 40 is in a horizontal position and the strips of bacon may be laid thereon. The plate 38 may then be pivoted backwardly to a position against the bacon for clamping the bacon against the plate 40, so that the thermostatic latch bolt 74 is engaged in the notch 76, then the plates 38 and 40 may be rotated into the substantially vertical solid line position, as shown in FIG. 4, by operation of the handle 56, as hereinbefore described.

The electrical heating element 90 may then be energized and the bacon may be toasted in flat clamped position between the plates 38 and 40.

As the oil or grease is rendered from the bacon and as the relative moisture content of the bacon decreases, the temperature of the plate 38 and the bimetal thermostat 75 will increase until the latch portion 74 is withdrawn from the notch 76 whereupon the springs 92 and 94 will force the plate 38 away from the plate 40 and permit the crisp-cooked bacon to fall onto the screen 24.

It will be understood by those skilled in the art that the thermostatic latch 72 may be of any conventional adjustable type known to those skilled in the art, as desired, to permit adjustment of the ultimate temperature and, consequently, the degree to which the bacon may be fried or crisped, as desired.

During cooking or toasting of the bacon, the oil rendered therefrom drips downwardly between the plates 38 and 40 and passes through the screen 24 into the sump pan or drawer 20 and when the bacon is released by the thermostatic latch 74 and is deposited on the screen tray 24, the bacon, together with the tray, may be withdrawn outwardly from the frame 10 by pulling the manual handle 28 in the direction of the arrow A, shown in FIG. 2 of the drawings.

It will be obvious to those skilled in the art that various modifications of the present invention may be resorted to in a manner limited only by a just interpretation of the following claims.

I claim:

1. In a bacon toaster the combination of, a frame; a pair of toaster plates having first edges hinged together and having second edges opposed to said first edges and movable apart; heating means for one of said plates; latch means coupled to and disposed to hold said second edges together and to thereby retain bacon clamped between said pair of plates; said plates pivoted on said frame about a substantially horizontal axis; said plates having bacon engaging surfaces adapted to be disposed in substantially vertical or horizontal positions in accordance with pivotal movement of said plates about said horizontal axis; a screen carried by said frame and disposed below said plates; said latch means being thermostatically responsive to a predetermined elevated temperature and adapted to release said opposite edges from each other automatically to drop toasted bacon on said screen, said plates being in a vertical position during toasting of bacon therebetween; and means tending to cause said plates to swing apart when released by said latch means.

2. In a bacon toaster the combination of: a frame; a pair of toaster plates having first edges hinged together and having second edges opposed to said first edges and movable apart; heating means for one of said plates; latch means coupled to and disposed to hold said second edges together and to thereby retain bacon clamped between said pair of plates; said plates pivoted on said frame about a substantially horizontal axis; said plates having bacon engaging surfaces adapted to be disposed in substantially vertical or horizontal pistons in accordance with pivotal movement of said plates about said horizontal axis; a screen carried by said frame and disposed below said plates; said latch means being thermostatically responsive to a predetermined elevated temperature and adapted to release said opposite edges from each other automatically to drop toasted bacon on said screen, said plates being in a vertical position during toasting of bacon therebetween; means tending to cause said plates to swing apart when released by said latch means; and a drip catching sump means below said screen.

3. In a bacon toaster the combination of: a frame; a pair of toaster plates having first edges hinged together and having second edges opposed to said first edges and movable apart; heating means for one of said plates; latch means coupled to and disposed to hold said second edges together and to thereby retain bacon clamped between said pair of plates; said plates pivoted on said frame about a substantially horizontal axis; said plates having bacon engaging surfaces adapted to be disposed in substantially vertical or horizontal positions in accordance with pivotal movement of said plates about said horizontal axis; a screen carried by said frame and disposed below said plates; said latch means being thermostatically responsive to a predetermined elevated temperature and adapted to release said opposite edges from each other automatically to drop toasted bacon on said screen, said plates being in a vertical position during toasting of bacon therebetween; means tending to cause said plates to swing apart when released by said latch means; and a drip catching sump means below said screen; said screen slidably mounted in said frame and adapted to be withdrawn outwardly therefrom relative to said plates and to said sump to carry toasted bacon outwardly beyond a side of said frame.

4. In a bacon toaster the combination of: a frame; a pair of flat, non-perforated toaster plates having first edges hinged together and having second edges opposed to said first edges and movable apart; heating means thermally conductively coupled to one of said plates; and latch means coupled to and disposed to hold said second edges together and to thereby retain bacon clamped between said pair of plates; said plates pivoted on said frame about a substantially horizontal axis; said plates having bacon engaging surfaces adapted to be disposed in substantially vertical or horizontal positions in accordance with pivotal movement of said plates about said horizontal axis; said heating means comprising an electrical heating element carried by one of said plates.

5. In a bacon toaster the combination of: a frame; a pair of toaster plates having first edges hinged together and having second edges opposed to said first edges and movable apart; heating means for one of said plates; latch means coupled to and disposed to hold said second edges together and to thereby retain bacon clamped between said pair of plates; said plates pivoted on said frame about a substantially horizontal axis; and plates having bacon engaging surfaces adapted to be disposed in substantially vertical or horizontal positions in accordance with pivotal movement of said plates about said horizontal axis; a screen carried by said frame and disposed below said plates; said latch means being thermostatically responsive to a predetermined elevated temperature and adapted to release said opposite edges from each other automatically to drop toasted bacon on said screen; and spring means coupled to said plates and disposed to force said plates apart at said second edges when released by said latch means.

References Cited

UNITED STATES PATENTS

| | | | |
|---|---|---|---|
| 1,517,795 | 12/1924 | Morrisson et al. | 99—397 |
| 1,809,172 | 6/1931 | Le Sauvage | 99—427 |
| 2,198,134 | 4/1940 | Spiegl | 99—393 |
| 2,207,264 | 7/1940 | Nueberger | 99—373 |
| 2,387,621 | 10/1945 | Stangle | 99—397 |
| 2,681,001 | 6/1954 | Smith | 99—402 |
| 2,751,840 | 6/1956 | Layton et al. | 99—341 |
| 2,760,428 | 8/1956 | Boyajian | 99—427 |
| 2,893,307 | 7/1959 | Rodriguez | 99—427 X |
| 2,903,549 | 9/1959 | Joseph | 99—446 X |
| 3,031,948 | 5/1962 | Lotter | 99—400 X |

BILLY J. WILHITE, *Primary Examiner.*